US008672360B2

(12) United States Patent
Fracek

(10) Patent No.: US 8,672,360 B2

(45) Date of Patent: Mar. 18, 2014

(54) SYSTEM AND METHOD FOR TACTILE CURRENCY IDENTIFICATION

(76) Inventor: George Fracek, Grove, OK (US)

( * ) Notice: Subject to any disclaimer, the term of this patent is extended or adjusted under 35 U.S.C. 154(b) by 392 days.

(21) Appl. No.: 12/643,587

(22) Filed: Dec. 21, 2009

(65) Prior Publication Data

US 2010/0164216 A1 Jul. 1, 2010

Related U.S. Application Data

(60) Provisional application No. 61/141,488, filed on Dec. 30, 2008.

(51) Int. Cl.

| | |
|---|---|
| ***B42D 1/00*** | (2006.01) |
| ***B42D 19/00*** | (2006.01) |
| ***B42D 15/00*** | (2006.01) |
| ***B42D 15/10*** | (2006.01) |
| ***G09C 3/00*** | (2006.01) |

(52) U.S. Cl.

USPC .......... 283/57; 281/2; 281/5; 283/61; 283/62; 283/67; 283/70; 283/72; 283/74; 283/79; 283/94; 283/98; 283/105; 283/901

(58) Field of Classification Search

USPC ........ 281/2, 5; 283/57, 61, 62, 67, 70, 72, 74, 283/79, 94, 98, 105, 113, 901

See application file for complete search history.

(56) References Cited

U.S. PATENT DOCUMENTS

| | | | | |
|---|---|---|---|---|
| 5,698,333 | A | 12/1997 | Benoit et al. | |
| 7,399,513 | B2 * | 7/2008 | Pearson et al. | 283/113 |
| 2004/0008871 | A1 * | 1/2004 | Smith | 382/114 |
| 2005/0150740 | A1 | 7/2005 | Finkenzeller et al. | |
| 2005/0211403 | A1 * | 9/2005 | Hard | 283/72 |
| 2006/0255587 | A1 * | 11/2006 | Lazzerini | 283/72 |
| 2007/0110296 | A1 * | 5/2007 | Alattar | 283/72 |
| 2008/0134849 | A1 * | 6/2008 | McGough | 83/13 |

OTHER PUBLICATIONS

Notification Concerning Transmittal of International Preliminary Report on Patentability dated Jul. 14, 2011 in International application No. PCT/US2009/069004.

Committee on Currency Features Usable by the Visually Impaired. "Currency Features for Visually Impaired People", National Research Council, published 1995 [online]. [retrieved on Feb. 4, 2010]. Retrieved from the Internet: <URL: http://www.nap.edu/catalog/4828.html>.

* cited by examiner

*Primary Examiner* — Shelley Self

*Assistant Examiner* — Justin V Lewis

(74) *Attorney, Agent, or Firm* — McAndrews, Held & Malloy, Ltd.

(57) ABSTRACT

A tactile orientation indicator is positioned along the periphery of a bill, and a tactile denomination indicator is positioned elsewhere along the periphery of the bill. The user of the bill may then use their tactile senses to feel along the edges of the bill to orient the bill to a pre-determined orientation based on the location of the orientation indicator. The user then feels along the periphery of the bill to locate the denomination indicator. Using a predetermined system associating the location of the denomination indicator with a particular bill denomination, the user may then identify the denomination of the bill even if blind or otherwise visually impaired.

22 Claims, 6 Drawing Sheets

SYSTEM AND METHOD FOR TACTILE CURRENCY IDENTIFICATION

RELATED APPLICATIONS

This application makes reference to, claims priority to, and claims the benefit of U.S. Provisional Patent Application Ser. No. 61/141,488, entitled "System and Method for Tactile Currency Identification," filed Dec. 30, 2008, the complete subject matter of which is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present system and method for tactile currency identification generally relates to the identification of physical items by tactile feel. More specifically, the present system and method for tactile currency identification relates to a system and method for the identification of bills by denomination using strategically positioned tactile indicators.

The bills printed by the Treasury Department of the United States of America have been changed in several respects over the last decade in an effort to hinder counterfeiting. Despite these changes, the bills used as United States currency have essentially retained the same size, shape and feel, regardless of denomination. The same is true for many non-government issued bills. Such bills are used for various purposes, including but not limited to use as a training aid for the visually impaired or as faux currency in board games.

The lack of tactile distinctiveness between various denominations of these bills poses a significant problem for the blind, and the visually impaired. Some foreign nations have designed their bills in an effort to make the denominations of those bills identifiable by touch to the blind and/or otherwise visually impaired. For example, some foreign currency systems reflect different denominations of bills by different sizes and/or colors. In addition, some foreign currencies use an insert, Braille element, perforations, or a raised element in their currency to identify bill denominations to the visually impaired.

However, these existing designs do not utilize the relative positioning of various inserts, Braille elements, perforations, and/or raised elements to promote identification of the denomination of the currency. In addition, the level of tactile feel provided by these designs may be problematic to the blind and/or visually impaired who also have limited sensation in their extremities, which is a common problem among diabetics.

BRIEF SUMMARY OF THE INVENTION

The present system and method for tactile currency identification creates or modifies faux or legal tender bills such that the bills can be easily identified by touch. In this fashion, blind or otherwise visually impaired users can determine the denomination of the bills they are using. The present system and method may also be useful to non-visually impaired users in low light conditions.

The present system and method for tactile currency identification generally involves strategically positioning tactile indicators along the periphery of a bill. Tactile indicators may include an orientation indicator and a denomination indicator. An orientation indicator is used to orient the bill to the user in a unique way. Once the bill is properly orientated, an additional tactile indicator elsewhere along the periphery of the bill, i.e. a denomination indicator, identifies the denomination of the bill to the user.

For example, an "orientation notch" may be placed in the upper left hand corner of a bill when the bill is facing front-side up and right-side up. This orientation notch serves to orient the bill to the user, regardless of denomination. The location of a "denomination notch" along an edge of the bill relative to the orientation notch may then be utilized to identify the value of the bill to the user. The denomination notch may be located along any edge of the bill.

One embodiment of the present system and method for tactile currency identification involves currency for use as faux or legal tender, the currency comprising: a bill, the bill having a front surface, a rear surface, an upper edge, a lower edge, a left edge, a right edge, and four corners; an orientation indicator located at one of the four corners, the location of the orientation indicator corresponding to a particular bill orientation relative to the user, the orientation indicator tactilely distinct from the bill; a denomination indicator located at one of the edges of the bill, the location of the denomination indicator relative to the orientation indicator corresponding to a particular bill denomination, the denomination indicator tactilely distinct from the bill.

According to the present system and method for tactile currency identification, at least one of the orientation and denomination indicators may be comprised of a notch, and the notch may be semicircular in shape. Further, at least one of the orientation and denomination indicators may also be comprised of a raised element on at least one surface of the bill, a Braille element, an insert located between the front surface and the rear surface of a bill; and/or a perforation in the bill. The orientation indicator may tactilely distinct from the denomination indicator. The bill may further comprise a warning indicator positioned near a corner or edge of the bill for warning the user that the bill is faux currency, the warning indicator tactilely distinct from the bill. The warning indicator may be comprised of multiple perforations.

One embodiment of the present system and method for tactile currency identification involves a method for making the denomination of a bill identifiable by tactile feel, the bill for use as faux currency or legal tender, the bill having a front surface, a rear surface, an upper edge, a lower edge, a left edge, a right edge, and four corners, the method comprising: positioning an orientation indicator at one of the four corners of the bill, the position of the orientation indicator corresponding to a particular bill orientation relative to the user, the orientation indicator tactilely distinct from the bill; positioning a denomination indicator at one of the edges of the bill, the position of the denomination indicator relative to the orientation indicator corresponding to a particular bill denomination, the denomination indicator tactilely distinct from the bill.

According to the present system and method for tactile currency identification, at least one of the orientation and denomination indicators may be comprised of a notch in the bill, and the notch may be semicircular in shape. Further, at least one of the orientation and denomination indicators may also be comprised of a raised element on at least one surface of the bill; a Braille element; an insert located between the front surface and the rear surface of a bill; and/or a perforation in the bill. The orientation indicator may tactilely distinct from the denomination indicator. The bill may further comprise a warning indicator positioned near a corner or edge of the bill for warning the user that the bill is faux currency, the warning indicator tactilely distinct from the bill. The warning indicator may be comprised of multiple perforations.

The present system and method may be implemented on new or existing bills using, for example and not by way of limitation, tactile indicators comprised of notches, Braille elements, inserts, perforations, or raised elements. Advantageously, this system and method does not require a change in the size or shape of the bills. The present system and method for tactile currency identification is a cost-effective and simple-yet-elegant solution to a longstanding problem.

DETAILED DESCRIPTION OF THE INVENTION

Figure 1:
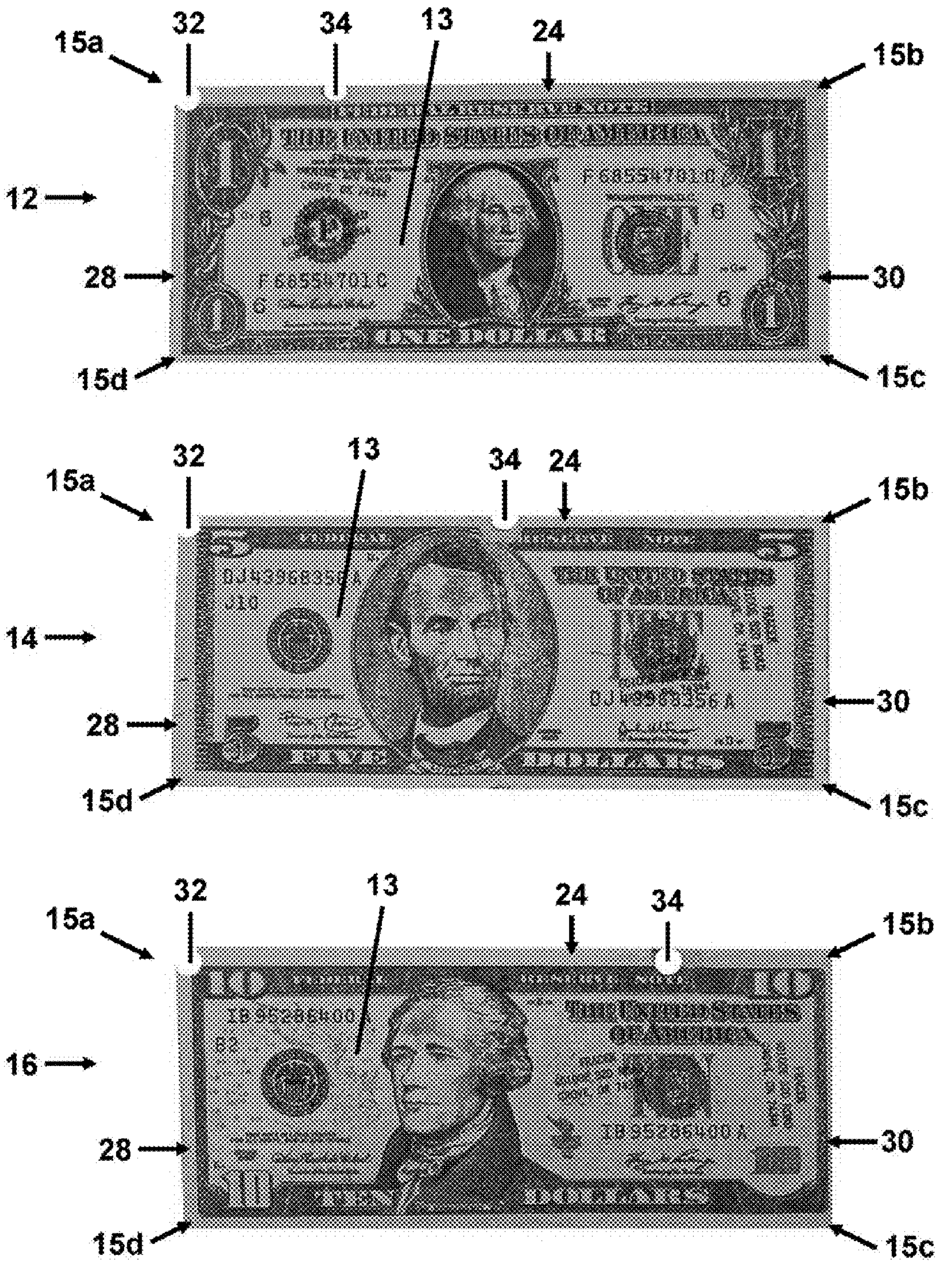
FIG. 1 illustrates the presently preferred embodiment of the system and method for tactile currency identification using bills issued by the United States Treasury in one, five and ten dollar denominations.
Figure 2:
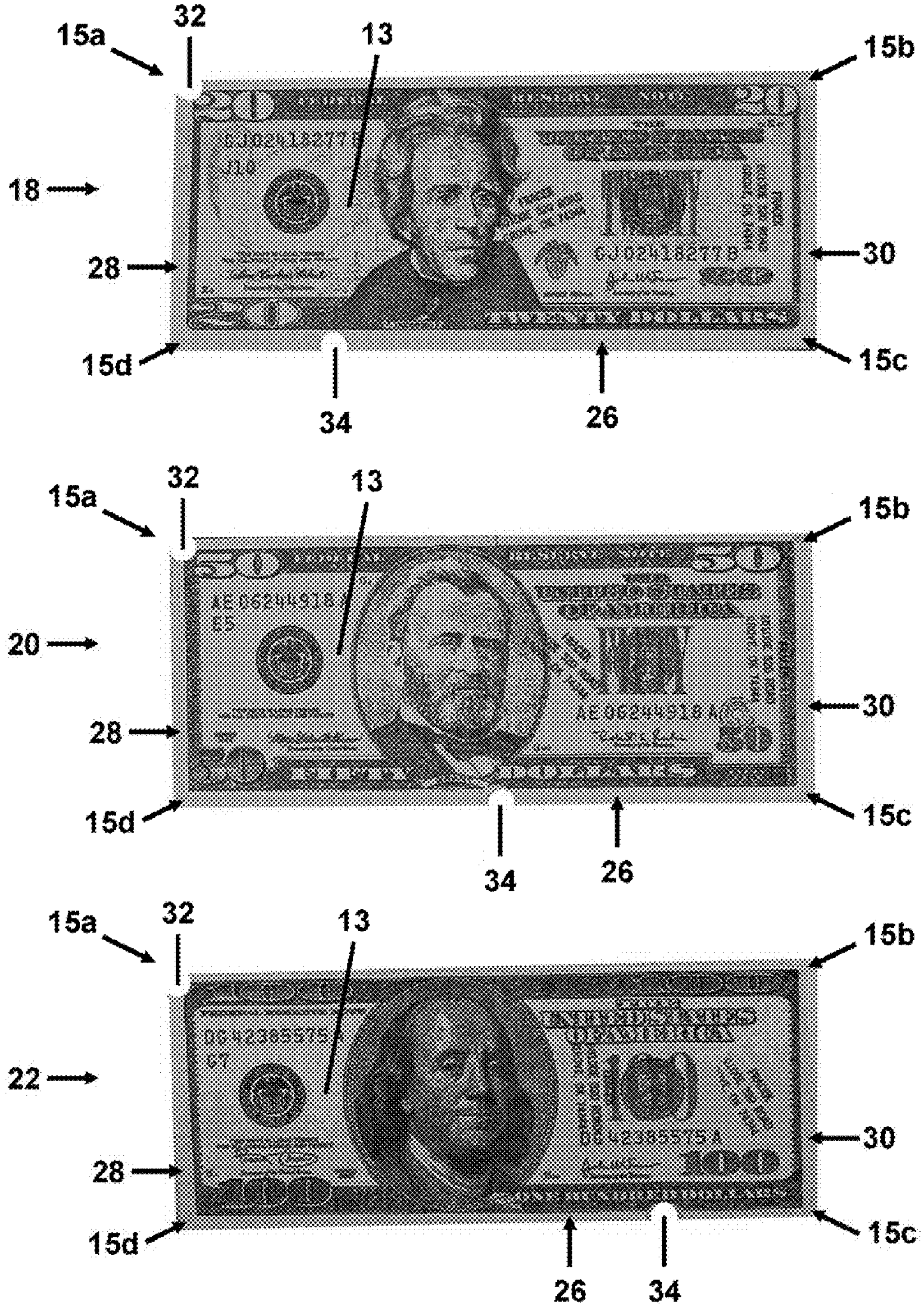
FIG. 2 illustrates the presently preferred embodiment of the system and method for tactile currency identification using bills issued by the United States Treasury in twenty, fifty and one-hundred dollar denominations.
Figure 3:
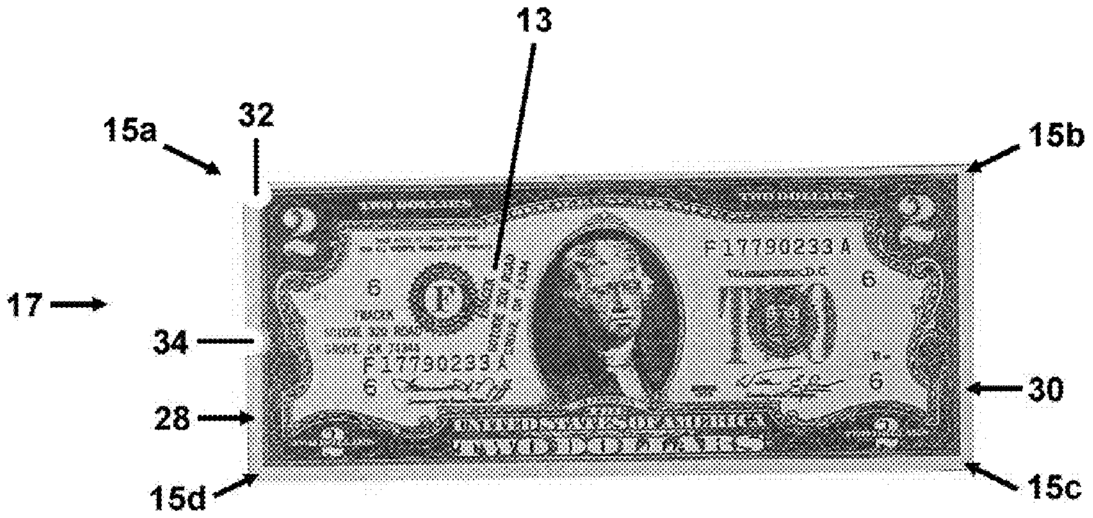
FIG. 3 illustrates the presently preferred embodiment of the system and method for tactile currency identification using a two-dollar bill issued by the United States Treasury.

The present system and method for tactile currency identification may be used to create or modify a bill by positioning tactile indicators along the periphery of the bill for tactile orientation of the bill to the user, and tactile identification of the bill's denomination. The presently preferred embodiment of the system and method relating to bills issued by the United States Treasury is illustrated in FIGS. 1-3. Each of the bills in these figures has a front surface 13 on one side of the bill and a rear surface on the opposite side (not shown), and four corners 15*a*, 15*b*, 15*c*, and 15*d*.

Turning now to FIG. 1, bills issued by the United States Treasury are depicted in denominations of one dollar 12, five dollars 14 and ten dollars 16. In this embodiment, a semi-circular orientation notch 32 is positioned in the upper left hand corner 15*a* of each bill when the front surface 13 is facing up and orientated right-side up. There are no notches in any of the remaining three corners. A semi-circular denomination notch 34 is positioned along the upper edge 24 of the bills. The position of denomination notch 34 along upper edge 24 serves to identify the value of the bill to the user. Although orientation notch 32 and denomination notch 34 are depicted as semi-circular, other notch shapes that provide for tactile identification are also possible, including for example and without limitation, triangular, square, rectangular, oval, etc.

Denomination notch 34 is positioned on upper edge 24 one-quarter of the length of upper edge 24 from left edge 28 for the one dollar bill 12. For five dollar bill 14, denomination notch 34 is positioned on upper edge 24 one-half of the length of upper edge 24 from left edge 28. On ten dollar bill 16, denomination notch 34 is positioned on upper edge 24 three-quarters of the length of upper edge 24 from left edge 28.

The position of denomination notch 34 along upper edge 24 relative to left edge 28 and/or orientation notch 32 serves to identify the value of the bill to the user. A user can identify the denomination of the bills in FIG. 1 by simply holding each bill such that orientation notch 32 is in the upper left hand corner of the bill, and then checking to find where denomination notch 34 is located along upper edge 24 relative to left edge 28 and/or orientation notch 32. In particular, a user may hold the bill in the user's right hand, and check the corners of the bill for orientation notch 32 using the index finger of the user's left hand. Once orientation notch 32 is located, the user may rotate the bill as needed so that orientation notch 32 is positioned on the top left side of the bill.

Placing the bill in the user's left hand, the user may use a thumb and index finger on the right hand to feel for denomination notch 34. Once located, the user may continue running fingers along the edge of the bill to better understand where on the bill denomination notch 34 is located, and also to feel for the presence of other notches. If there are no other notches, the bill should be legitimate. If there are any other punches besides orientation notch 32 and denomination notch 34, the user should refuse to take the bill. If the user has difficulty determining whether denomination notch 34 is one-quarter, one-half or three-quarters of the way along upper edge 24 from left edge 28 and/or orientation notch 32, the user may gently fold the bill over, right edge 30 over left edge 28, and the precise location of denomination notch 34 may be better understood.

Larger denomination bills issued by the United States Treasury in denominations of twenty dollars 18, fifty dollars 20 and one-hundred dollars 22 are shown in FIG. 2. A semi-circular orientation notch 32 is again positioned in the upper left hand corner 15*a* of each bill when front surface 13 is facing up and orientated right-side up. There are no notches in any of the remaining three corners. This time, however, a semi-circular denomination notch 34 is positioned along lower edge 26 of the bills instead of upper edge 24. The location of denomination notch 34 along lower edge 26 relative to left edge 28 and/or orientation notch 32 serves to identify the value of the bill to the user.

Turning now to FIG. 2, a denomination notch 34 is positioned on lower edge 26 one-quarter of the length of lower edge 26 from left edge 28 for twenty dollar bill 18. For fifty dollar bill 20, denomination notch 34 is positioned on lower edge 26 one-half of the length of lower edge 26 from left edge 28. On hundred dollar bill 22, denomination notch 34 is positioned on lower edge 26 three-quarters of the length of lower edge 26 from left edge 28. A user can identify the denomination of the bills in FIG. 2 by simply holding each bill such that orientation notch 32 is in the upper left hand corner of the bill, and then checking to find where denomination notch 34 is located along lower edge 26 relative to left edge 28 and/or orientation notch 32.

Other denominations could be identified by placing denomination notches along left edge 28 and/or right edge 30 of the bills. For example, the bill in FIG. 3 has an orientation notch 32 positioned in the upper left hand corner 15*a* of the bill, but denomination notch 34 is positioned on left edge 28 one-half of the length of left edge 28 from upper edge 24 and orientation notch 32 for two dollar bill 17. A user can identify the denomination of the bill in FIG. 3 by simply holding the bill such that orientation notch 32 is in the upper left hand corner of the bill, and then checking to find whether denomination notch 34 is located along left edge 28 or right edge 30, or where denomination notch 34 is located along left edge 28 or right edge 30 relative to left edge 28 and/or orientation notch 32.

It should be understood that while orientation notch 32 is positioned in upper left hand corner 15*a* in the above examples, positioning orientation notch 32 in any of the other three corners would also serve to orient the bill to the user so long as the user is informed of the strategy underlying the positioning of orientation notch 32. It should also be understood that while denomination notch 34 is positioned in specific spots on specific edges in the above examples, locating denomination notch 34 in other spots or on other edges would also serve to identify the denomination of the bill to the user so long as the user is informed of the strategy underlying the positioning of denomination notch 34.

Furthermore, while notches are employed as tactile indicators in the above embodiments, other tactile indicators may also be used. For example, and not by way of limitation, tactile indicators may comprise: inserts placed between front surface 13 or rear surface (not shown) of the bill; Braille elements attached to, formed on, or inserted between the front surface 13 and/or the rear surface (not shown) of the bill; perforations in the bill; and/or raised elements attached to the front surface 13 and/or the rear surface (not shown) of the bill. Notches are presently preferred as tactile indicators for their relatively high tactile feel, straightforward implementation, and low cost when compared with other tactile indicators. It should be understood, however, that the present system and method is not limited to tactile indicators comprised of notches, or any single type of tactile indicator.

A combination of different types of tactile indicators may be used to construct, for example, a single orientation indicator or denomination indicator. For instance, a denomination indicator employing a notch may also include raised elements outlining the notch to increase the level of tactile feel posed by the denomination indicator. In general, tactile indicators positioned at a corner or edge of a bill may or may not intersect the extreme outer edge of the bill.

Figure 4:
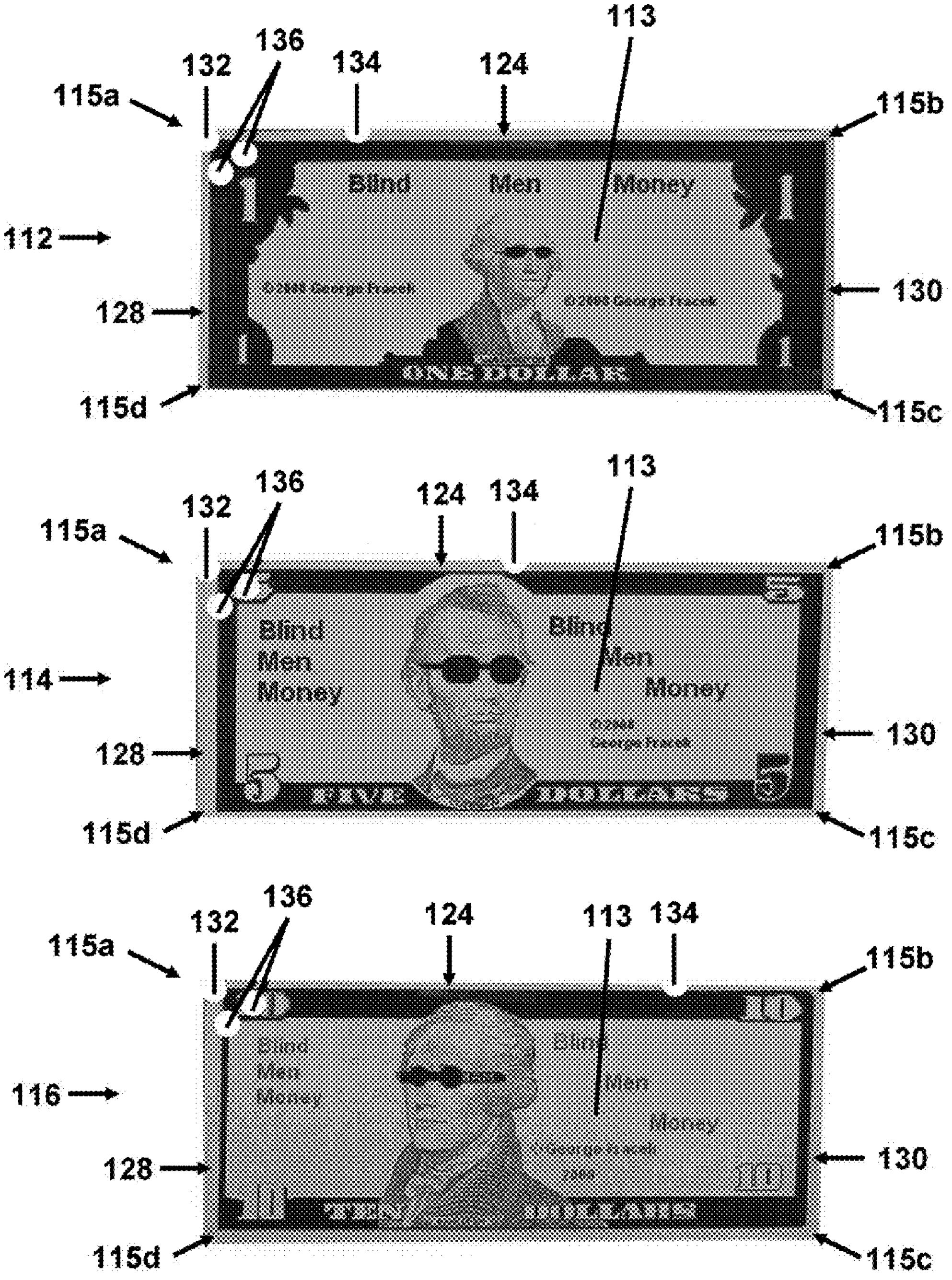
FIG. 4 illustrates the presently preferred embodiment of the system and method for tactile currency identification using non-government issued bills in one, five and ten dollar denominations.
Figure 5:
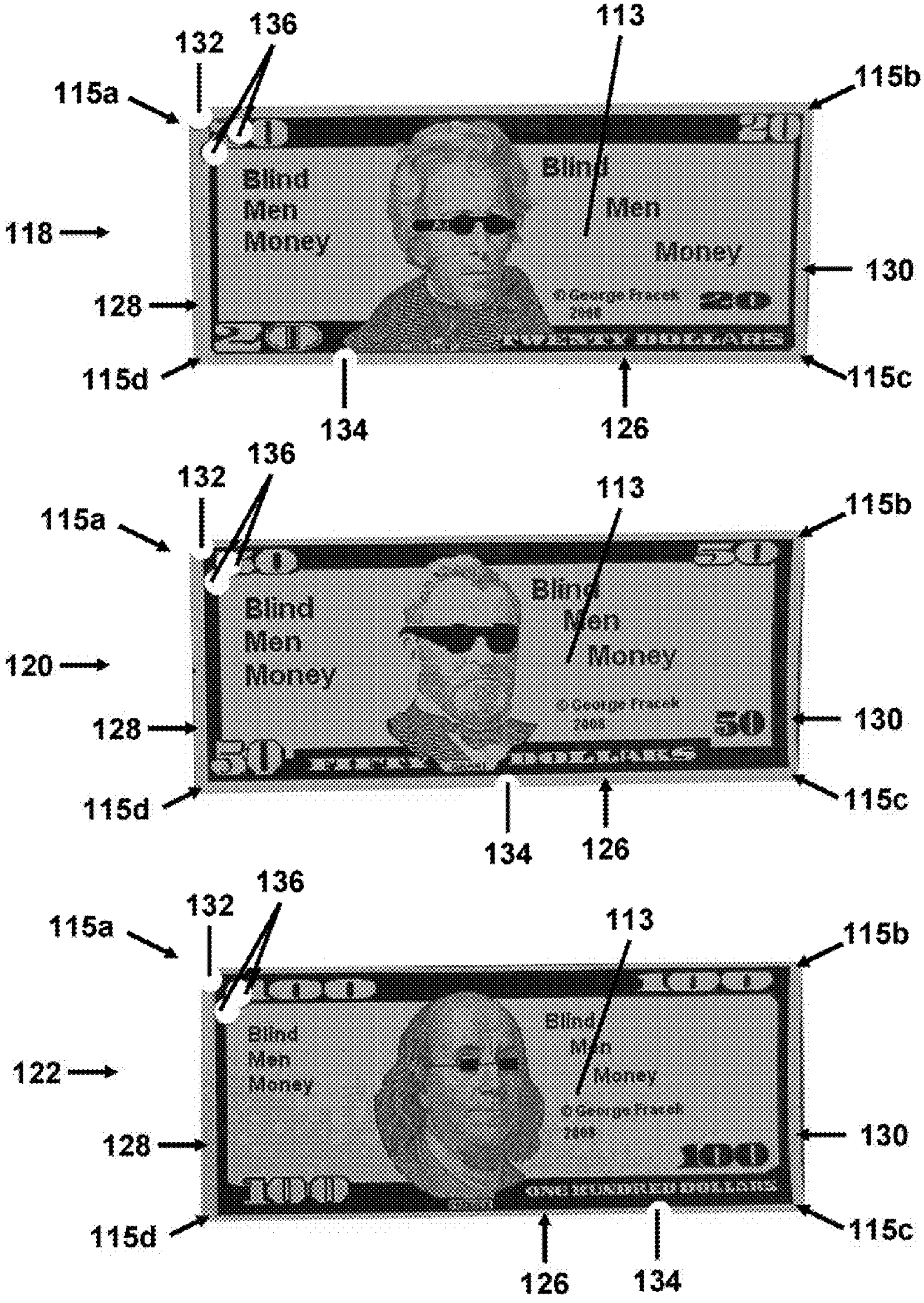
FIG. 5 illustrates the presently preferred embodiment of the system and method for tactile currency identification using non-government issued bills in twenty, fifty and one-hundred dollar denominations.
Figure 6:
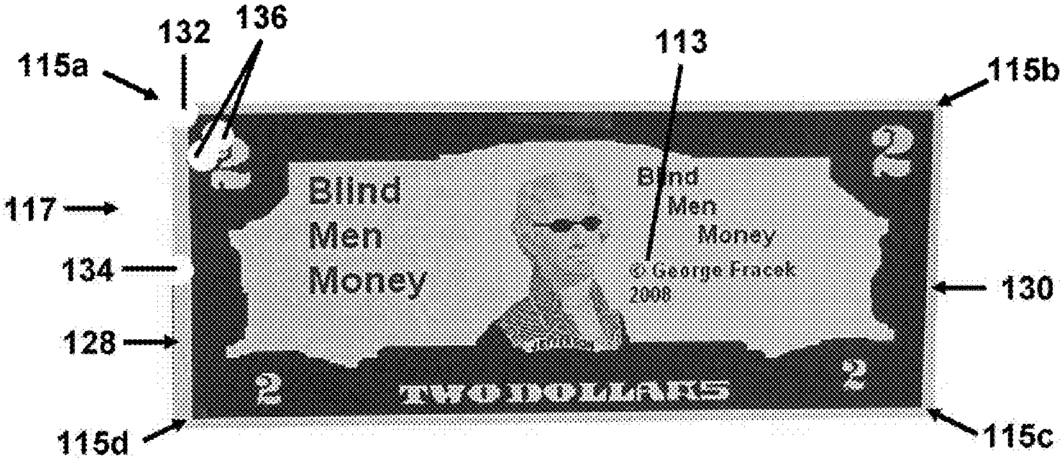
FIG. 6 illustrates the presently preferred embodiment of the system and method for tactile currency identification using a non-government issued two-dollar bill.

The preferred embodiment of the present system and method relating to non-government issued bills is illustrated in FIGS. 4-6. Each of the bills in these figures have a front surface 113 on one side of the bill and a rear surface on the opposite side (not shown), and four corners 115*a*, 115*b*, 115*c*, and 115*d*.

Turning to FIG. 4, non-government issued bills 110 are depicted in denominations of one dollar 112, five dollars 114 and ten dollars 116. A semi-circular orientation notch 132 is positioned in the upper left hand corner of each bill when the front of the bill is facing up and orientated right-side up. There are no notches in any of the remaining three corners. A semi-circular denomination notch 134 is positioned along the upper edge 124 of the bills. The location of denomination notch 134 along upper edge 124 relative to left edge 128 and/or orientation notch 132 serves to aid the user in identifying the value of the bill.

As seen in FIG. 4, denomination notch 134 is formed on upper edge 124 one-quarter of the length of upper edge 124 from corner 115*a* or left edge 128 for the one dollar bill 112. For five dollar bill 114, denomination notch 134 is positioned on upper edge 124 one-half of the length of upper edge 124 from corner 115*a* or left edge 128. On ten dollar bill 116, denomination notch 134 is positioned on upper edge 124 three-quarters of the length of upper edge 124 from corner 115*a* or left edge 128. Although orientation notch 132 and denomination notch 134 are depicted as semi-circular, other notch shapes that provide for tactile identification are also possible, including for example and without limitation, triangular, square, rectangular, oval, etc.

A user can identify the denomination of the bills in FIG. 4 by simply holding each bill such that orientation notch 132 is in the upper left hand corner of the bill, and then checking to see where denomination notch 134 is located along upper edge 124.

Note that another tactile indicator, here warning indicator 136 comprised in this example of perforations in the form of two punches, has been positioned on the non-government issued bills near corner 115*a* and orientation notch 132 to denote that the bills are not valid U.S. currency. Warning indicator 136 may be unnecessary where the bill is significantly different in size or shape from valid government issued currency. While warning indicator 136 is depicted in this embodiment as punches, other forms of warning indicator 136 may be used. For example, and without limitation, warning indicator 136 may also be comprised of one or more notches, Braille elements, inserts, perforations, or raised elements. Moreover, warning indicator need not be positioned near corner 115*a*, or any corner for that matter, so long as the user is informed of the strategy underlying the positioning of warning indicator 136. It is preferred, however, that warning indicator 136 not be positioned at a corner or edge to prevent any potential confusion with orientation indicator 132 or denomination indicator 134.

Larger denomination non-government issued bills 110 are shown in FIG. 5. Again, a semi-circular orientation notch 132 is positioned in the upper left hand corner of each bill when the front of the bill is facing up and orientated right-side up. There are no notches in any of the remaining three corners. This time, however, semi-circular denomination notch 134 is positioned along lower edge 126 of the bills instead of upper edge 124. The location of denomination notch 134 along lower edge 126 relative to left edge 128 and/or orientation notch 132 serves to aid the user in identifying the value of the bill.

As seen in FIG. 5, denomination notch 134 is positioned on lower edge 126 one-quarter of the length of lower edge 126 from left edge 128 for the twenty dollar bill 118. For fifty dollar bill 120, denomination notch 134 is positioned on lower edge 126 one-half of the length of lower edge 126 from left edge 128. On hundred dollar bill 122, denomination notch 134 is positioned on lower edge 124 three-quarters of the length of lower edge 124 from left edge 128.

A user can identify the denomination of the bills in FIG. 5 by simply holding each bill such that orientation notch 132 is in the upper left hand corner of the bill, and then checking to see where denomination notch 134 is positioned along lower edge 126. Warning indicator 136, shown as two punches in this example, is positioned on the non-government issued bills near orientation notch 132 to denote that the bills are not valid U.S. currency.

Other denomination indicators could be positioned along left edge 128 and/or right edge 130 of the bills. As seen in FIG. 6, for example, denomination notch 134 is positioned on left edge 128 one-half of the length of left edge 128 from upper edge 124 for two dollar bill 117. Again, a user can identify the denomination of the bills in FIG. 6 by simply holding each bill such that orientation notch 132 is in the upper left hand corner of the bill, and then checking to see where denomination notch 134 is located along left edge 128 or right edge 130.

Once again, warning indicator 136, depicted as two punches in this embodiment, is positioned on non-government issued bills near orientation notch 132 to denote that the bills are not valid U.S. currency.

Although orientation notches 32 and 132, and denomination notches 34 and 134 are depicted in the preferred embodiments described above as semi-circular, the present system and method for tactile identification of currency contemplates a variety of other notch shapes. These notch shapes include, by way of example and not limitation, triangular-shaped notches and square-shaped notches.

It should be understood that while orientation notch 132 is positioned in upper left hand corner 115*a* in the above examples, positioning orientation notch 132 in any of the other three corners would also serve to orient the bill to the user so long as the user is informed of the strategy underlying the positioning of orientation notch 132. It should also be understood that while denomination notch 134 is positioned in a specific position on specific edges in the above examples, positioning denomination notch 134 in other positions or on other edges would also serve to identify the denomination of the bill to the user so long as the user is informed of the strategy underlying the positioning of denomination notch 134.

Furthermore, while notches are employed as tactile indicators in the above embodiments relating to non-U.S. government currency, other tactile indicators may also be used. For example, and not by way of limitation, tactile indicators may comprise: inserts placed between front surface 113 or rear surface (not shown) of the bill; Braille elements attached to, formed on, or inserted between the front surface 113 and/or the rear surface (not shown) of the bill; perforations in the bill; and raised elements attached to the front surface 113 and/or rear surface (not shown) of the bill. Notches are presently preferred as tactile indicators for their relatively high tactile feel, straightforward implementation, and low cost when compared with other tactile indicators. It should be understood, however, that the present system and method as it relates to non-U.S. government currency is not limited to tactile indicators comprised of notches.

Orientation notches 32 and 132 and denomination notches 34 and 134 may be positioned on new bills by using, for example, cutting or punching tools. Existing bills may also be modified to comport with the presently preferred system and method for tactile identification of currency by, for example, cutting or punching notches in the bills. Braille elements, raised elements, and inserts can be created or added in a variety of ways that are well-known to those of skill in the art.

Although orientation notches 32 and 132 are depicted above as orienting the bills front face up and right side up to the user, orientation notches 32 and 132 may be positioned in a different corner to orient the bills otherwise. The preferred embodiment, however, complements the English “left to right” and “top to bottom” method of reading.

Similarly, although the progression of denomination notches 34 and 134 depicted above also complements the English “left to right” and “top to bottom” method of reading, denomination notches 34 and 134 may be positioned in different locations along the edges of a bill in accordance with the present system and method for tactile identification of currency. For example, and not by way of limitation, lower value denomination notches could be positioned along lower edge 26 or 126, and higher value denomination notches could be positioned along upper edge 24 or 124. These and other variants of the present system and method for tactile identification of currency may be effected by those skilled in the art without departing from the spirit or scope of the present system and method for tactile identification of currency.

The invention claimed is:

1. Currency for use, by a user having a sense of touch, as faux or legal tender, the currency comprising:

a plurality of bills, each of the plurality of bills having a body portion having a front surface, a rear surface, a plurality of edges, and a plurality of corners;

an orientation indicator located at one of the plurality of corners, the location of the orientation indicator corresponding to a particular bill orientation relative to the user, the orientation indicator being generally in the same position for each of the plurality of bills, the orientation indicator being tactilely distinct, by the sense of touch, from the body portion;

a denomination indicator positioned along at least one of the plurality of edges at a distance away from the orientation indicator, the distance corresponding to a bill denomination, the distance being different for at least two of the plurality of bills to indicate differences in the bill denominations of those at least two bills of the plurality of bills, the denomination indicator being tactilely distinct, by the sense of touch, from the body portion.

2. The currency of claim 1, wherein at least one of the orientation and denomination indicators is comprised of a notch.

3. Currency for use, by a user having a sense of touch, as faux or legal tender, the currency comprising:

a plurality of bills, each of the plurality bills having a body portion having a front surface, a rear surface, a plurality of edges, and a plurality of corners;

an orientation indicator positioned adjacent to at least a first edge of the plurality of edges, the location of the orientation indicator corresponding to a particular bill orientation relative to the user, the orientation indicator being generally in the same position for each of the plurality of bills, the orientation indicator being tactilely distinct, by the sense of touch, from the body portion;

a denomination indicator positioned at a distance away from the first edge, the distance corresponding to a bill denomination, the distance being different for at least two of the plurality of bills to indicate differences in the bill denominations of those at least two bills of the plurality of bills, the denomination indicator being tactilely distinct, by the sense of touch, from the body portion.

4. The currency of claim 1, wherein at least one of the orientation and denomination indicators is comprised of a raised element on at least one surface of the bill.

5. The currency of claim 1, wherein at least one of the orientation and denomination indicators is comprised of a Braille element.

6. The currency of claim 1, wherein at least one of the orientation and denomination indicators is comprised of an insert located between the front surface and the rear surface.

7. The currency of claim 1, wherein at least one of the orientation and denomination indicators is comprised of a perforation in the bill.

8. The currency of claim 1, further comprising a warning indicator positioned near at least one of the plurality of corners or edges of the bill for warning the user that the bill is faux currency, the warning indicator being tactilely distinct, by the sense of touch, from the bill.

9. The currency of claim 8, wherein the warning indicator is comprised of multiple perforations.

10. The currency of claim 1, wherein the orientation indicator is tactilely distinct from the denomination indicator.

11. A method for identifying the denomination of each of a plurality of bills by tactile feel by a user having a sense of touch, the plurality of bills for use as faux currency or legal tender, the plurality of bills each having a body portion having a front surface, a rear surface, a plurality of edges, and a plurality of corners, the method comprising:

positioning, at generally the same location on each of the plurality of bills, an orientation indicator at one of the plurality of corners of the bill, the position of the orientation indicator corresponding to a particular bill orientation relative to the user, the orientation indicator being tactilely distinct, by the sense of touch, from the body portion;

positioning a denomination indicator along at least one edge of the plurality of edges at a distance away from the orientation indicator, the distance corresponding to a bill denomination, the distance being different for at least two of the plurality of bills to indicate differences in the bill denominations of those at least two bills of the plurality of bills, the denomination indicator being tactilely distinct, by the sense of touch, from the body portion.

12. The method for making the denomination of a bill identifiable by tactile feel of claim 11, wherein at least one of the orientation and denomination indicators is comprised of a notch in the bill.

13. The method for making the denomination of a bill identifiable by tactile feel of claim 12, wherein the notch is semicircular in shape.

14. The method for making the denomination of a bill identifiable by tactile feel of claim 11, wherein at least one of the orientation and denomination indicators is comprised of a raised element on at least one surface of the bill.

15. The method for making the denomination of a bill identifiable by tactile feel of claim 11, wherein at least one of the orientation and denomination indicators is comprised of a Braille element.

16. The method for making the denomination of a bill identifiable by tactile feel of claim 11, wherein at least one of the orientation and denomination indicators is comprised of an insert positioned between the front surface and the rear surface.

17. The method for making the denomination of a bill identifiable by tactile feel of claim 11, wherein at least one of the orientation and denomination indicators is comprised of a perforation in the bill.

18. The method for making the denomination of a bill identifiable by tactile feel of claim 11, further comprising positioning a warning indicator near at least one of the plurality of corners or edges of the bill for warning the user that the bill is faux currency, the warning indicator being tactilely distinct from the bill.

19. The method for making the denomination of a bill identifiable by tactile feel of claim 18, wherein the warning indicator is comprised of multiple perforations.

20. The method for making the denomination of a bill identifiable by tactile feel of claim 11, wherein the orientation indicator is tactilely distinct from the denomination indicator.

21. The currency of claim 1, wherein at least one of the orientation and denomination indicators includes at least two different types of tactile identifiers that are tactilely distinct from the bill.

22. The method of claim 11, wherein at least one of the steps of positioning the orientation indicator or the denomination indicator includes positioning at least two different types of tactile indicators that are tactilely distinct from the bill.

* * * * *